United States Patent [19]

Giammarco et al.

[11] 3,725,529
[45] Apr. 3, 1973

[54] PROCESS FOR ELIMINATING $CO_2$ AND/OR $H_2S$ FROM GASEOUS MIXTURES

[75] Inventors: Guiseppe Giammarco; Paolo Giammarco, both of Venice, Italy

[73] Assignees: Vetrocoke Cokapuania S.p.A., Venezia Porto Marghera; Guiseppe Giammarco, Venice, Italy; part interest to each

[22] Filed: July 14, 1969

[21] Appl. No.: 841,526

[30] Foreign Application Priority Data

| | | |
|---|---|---|
| July 13, 1968 | Italy | 52432 A/68 |
| Apr. 23, 1969 | Italy | 51554 A/69 |
| July 18, 1968 | Italy | 52497 A/68 |
| Apr. 19, 1968 | Italy | 51504 A/68 |

[52] U.S. Cl. .................423/223, 423/229, 423/233
[51] Int. Cl. .............................................B01d 53/34
[58] Field of Search........23/2, 3.4, 2.3, 3.3, 180, 181

[56] References Cited

UNITED STATES PATENTS

| | | | |
|---|---|---|---|
| 960,788 | 6/1910 | Behrens | 23/150 |
| 2,477,314 | 7/1949 | Scharmann | 23/2 |
| 2,886,405 | 5/1959 | Benson et al. | 23/3 |
| 2,943,910 | 7/1960 | Giammarco | 23/2 |
| 3,042,483 | 7/1962 | Wolfram et al. | 23/2 |
| 3,101,996 | 8/1963 | Bresler et al. | 23/2 |
| 2,368,595 | 1/1945 | Johnson | 23/3 LA |
| 3,563,695 | 2/1971 | Benson | 23/2 R |

*Primary Examiner*—Earl C. Thomas
*Attorney*—Sughrue, Rothwell, Mion, Zinn & Macpeak

[57] ABSTRACT

A process for eliminating $CO_2$ and/or $H_2S$ from gaseous mixtures containing them by means of an absorbent aqueous solution circulated between an absorption phase and a regeneration phase. Gases produced at very high temperature, as in steam reforming or shift conversion, are placed in direct, intimate contact with the absorbing solution to provide heat for regeneration purposes rather than supplying the heat to conventional reboilers of the regeneration columns in the prior art. The process insures that the heat yielded at the absorption step does not interfere with the chemical absorption of $CO_2$ by subdividing the absorber into two zones, in which the chemical absorption of $CO_2$ is effected in one and the heat from the gas is given to part of the solution (or to another aqueous liquid) in the other zone. As a result, the solution is heated to a high temperature so that on expanding the solution at the regeneration step, a sufficient quantity of steam for regeneration is evolved.

The temperature of this solution at the absorption step is prevented from rising excessively be removing from the absorber part of the solution which is expanded and thereby cooled. This cooled solution is then returned to an intermediate level in the absorber in order to absorb further quantities of $CO_2$ and further quantities of heat.
The solution from the absorber which has been heated by the hot gases is expanded by a gradual progressive flash which is of considerably higher efficiency than the conventional simple instantaneous flashing.

6 Claims, 9 Drawing Figures

PROCESS FOR ELIMINATING $CO_2$ AND/OR $H_2S$ FROM GASEOUS MIXTURES

The present invention relates to processes for the elimination of $CO_2$ and/or $H_2S$ from gaseous mixtures which contain them, processes which in their practical industrial application consist of an absorption phase, generally at above atmospheric pressure, in which the gaseous mixtures are brought into contact with aqueous solutions of appropriate chemical composition and suitable for the elimination of $CO_2$ and/or $H_2S$, and a regeneration phase, generally at almost atmospheric pressure, in which the solutions are regenerated by boiling, the absorbed $CO_2$ and/or $H_2S$ being expelled.

Generally, the heat required for the cycle to operate is provided from outside by means of steam which is passed into a re-heater situated in symmetry with the bottom part of the regenerating column.

Of late, the processes for the elimination of $CO_1$ and/or $H_2S$ have found wide application in the purification of gases produced by reaction between a hydrocarbon and steam and/or oxygen at elevated temperature both in the presence and in the absence of a catalyst; the said gas which contains CO, as is well known, is subsequently subjected to a conversion reaction over catalysts by means of steam, resulting in the production of supplementary hydrogen. The gaseous mixtures thus obtained constituted mainly by $H_2$ and $CO_2$ are subjected to a treatment for the elimination of the $CO_2$ in order to obtain hydrogen gas, a raw material which is used in numerous processes, for example for the synthetic production of ammonia, methanol, or hydrogenation of unsaturated hydrocarbons and the like.

A fundamental characteristic of the aforesaid $CO_2$ elimination process is that the mixtures of $CO_2$ and $H_2$ originating from conversion are at a high temperature and contain an amount of heat which is generallysufficient for the $CO_2$ elimination cycle to function.

As is well-known, hitherto, the said heat has been used by passing the gaseous mixtures of $H_2$ and $CO_2$, hot and under pressure, first to the re-heater situated as mentioned above in symmetry with the bottom part of the regenerating column, where they give off the heat necessary for the regeneration of the absorbent solution, and subsequently to the absorption column.

In keeping with common opinion, the aforesaid arrangement is not the most opportune and convenient because it exhibits certain disadvantages which include for example:

the need to construct the re-heater of special steel with a consequent considerable increase in the cost of the apparatus, since the gaseous mixture in which the heat is to be utilized contains wet $CO_2$ and $H_2S$, notoriously highly corrosive;

the inpossibility of fully exploiting the heat contained in the gaseous mixture from the moment it is used only up to a temperature which is about 10° higher than the boiling temperature of the solution, in other words, in the majority of cases, up to 125° to 130°C.

The object of the present invention is a method allowing more rational use of the heat contained in the gaseous mixtures. Another object of the invention is usefully to extract a greater quantity of heat from the gaseous mixtures to be purified; another object of the invention is to reduce the quantity of heat required for functioning of the cycle; other purposes and advantages of the invention will become evident to men skilled in the art, from the detailed description contained herein.

By means and study and experiment, the Applicants have succeeded in achieving a new method of utilising the heat possessed by gaseous mixtures containing $CO_2$ and/or $H_2S$ whereby the heat is given off no longer in the re-heater but in direct contact to an aqueous liquid generally the same absorbent solution of known type, and is therefore utilised for regeneration of the solution itself.

The method according to the invention may be carried into effect by means of two alternatives A and B according to whether the heat contained in the gaseous mixture to be purified is given off during chemical absorption of the $CO_2$ and/or $H_2S$ or afterwards. In addition, some alternatives are possible according to whether it is desired or found convenient that the absorbent solution or the liquid to which the gaseous mixture to be purified gives up its heat substantially and considerably increases its temperature or on the other hand remains at a virtually unchanged temperature.

This may depend for example on the type of solution employed. It is in fact well-known that mineral solutions such as those of simple or activated alkaline carbonates are capable of withstanding substantially temperatures ttemperatures without decomposing and without becoming corrosive, whereas other types of solutions, for example those based on organic compounds of the ethanol amine, amino acid Alkazide and similar types cannot withstand great increases in temperature

Figure 1:
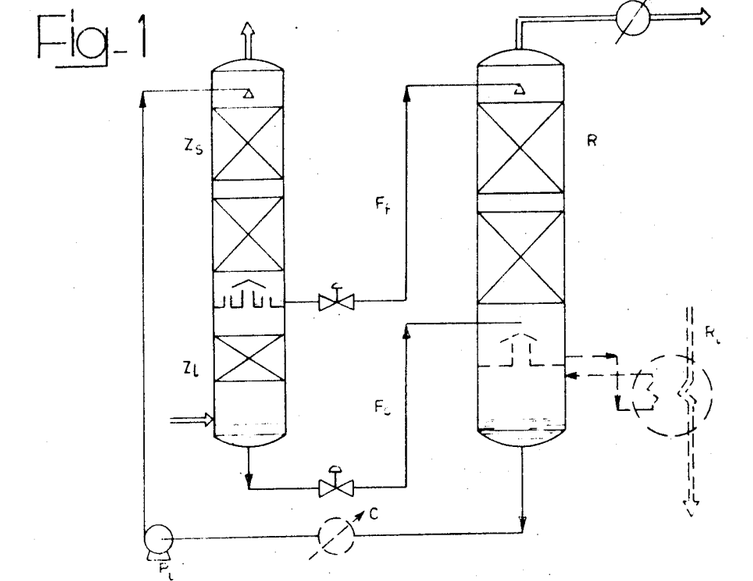
FIG. 1 shows one embodiment of the present invention identified as embodiment A1, discussed below.

A1. According to this alternative embodiment the heat contained in the gaseous mixture to be purified is given off to the absorbent solution after the latter has completed the chemical absorption of the $CO_2$ and/or $H_2S$.

The absorption plant takes a particular form and, with reference to FIG.1, is divided into two zones of which the upper zone $Z_s$ is intended for the chemical absorption of the $CO_2$ and/or $H_2S$, while the lower zone $Z_t$ is intended for the absorption of the heat contained in the gaseous mixture to be purified.

The gaseous mixture to be purified is supplied hot at the bottom of the zone $Z_t$ with a heat content which it is desired to use for functioning of the cycle; in direct contact, it gives off to the solution which descends from the top, almost all its heat after which it traverses the upper zone $Z_s$ where the $CO_2$ and/or $H_2S$ are eliminated.

In turn, the solution fed in at the top of the absorption column, passing through the upper zone $Z_s$, absorbs the $CO_2$ and/or $H_2S$ as is already known, becoming heated almost entirely by the heat of reaction.

At this point, the solution is divided into two fractions, the first of which, known as the cold fraction $Ff$, is passed to the top of the regenerating column R, while the second, known as the hot fraction $Fc$, continues its travel through the bottom zone $Z_i$ where it absorbs the heat possessed by the gaseous mixture, its own temperature increasing; it is then passed to the bottom of the regenerating column R where, expanding to the pressure obtaining there it develops an amount of vapor corresponding to the heat absorbed by the gaseous mixture. The vapor so developed is employed for the elimination of $CO_2$ and/or $H_2S$ and the regeneration of the solution itself, as described hereinafter.

Sub-division of the absorption column into two zones allows the heat given off by the gas to be purified to become concentrated in the hot fraction $Fc$ of the solution and not to disturb chemical absorption in the upper zone $Z_s$. This latter therefore is designed and dimensioned so that the efficiency of the absorption is normal and suitable: in particular, this is achieved by regulating the absorption so that the solution reaches on completion of absorption a degree of carbonation and a temperature such that the partial pressure of $CO_2$ and/or $H_2S$ in the gaseous mixture is at least 1.5 to 2 times the vapor pressure in $CO_2$ and/or $H_2S$ in the solution.

Generally speaking, when the present alternative is utilized in cases where the pressure of the gaseous mixture to be purified is comprised between 20 and 30 atm. and when the partial pressure of $CO_2$ in the gas is 2.5–5 atm. absolute and activated alkaline carbonate solutions are used, the degree of carbonatation (i.e., the percentage of alkali present in the form of bicarbonate) of the solution is approx. 75 percent and the temperature of the solution is preferably comprised in the range 90°–105°C and in some cases 110°C. In cases where the gaseous mixture is at an elevated pressure, for example 60–100 atm. and above, and the partial pressure of the $CO_2$ in the gaseous mixture is above 5 atm. absolute, the degree of carbonatation of the solution normally reaches 85–95 percent and the temperature of the solution itself may be still further increased. Thus, with a gaseous mixture having a partial pressure of 0.20 atm.absolute, a solution of potassium arsenite with an 85 percent degree of carbonatation may become heated to a temperature of 107°C, the $CO_2$ vapor pressure being about half that of the gas.

The hot fraction $Fc$ of the solution passing through the heat absorbent zone $Zi$, becomes heated to the temperature at which the partial pressure of the $CO_2$ and/or $H_2S$ of the gaseous mixture becomes equal to that of the liquid (when, in other words, the force of thrust is cancelled out), and in such cases there is no tendency on the part of the solution to restore part of the $CO_2$ and/or $H_2S$ previously absorbed. Thus, for example with gases at a partial $CO_2$ pressure of 20 atm. absolute, a solution of potassium arsenite with a degree of carbonatation of 85 percent may become heated to a temperature of 145°C, the vapor pressure of $CO_2$ of the solution at this temperature being equal to the partial pressure of $CO_2$ in the gaseous mixture. In this case, the use of activated alkaline carbonate solutions with $As_2O_3$ is preferable on account of the absence of any corrosive properties in the aforesaid solutions, even at elevated temperatures.

Nevertheless, it has been found that in industrial practice it is possible to increase the temperature of the hot fraction $Fc$ of the solution beyond the above-mentioned limits and without degassing $CO_2$, having regard to the fact that the heat contained in the gas is mainly constituted by water vapor which is absorbed and condensed at a velocity far greater than that at which $CO_2$ is chemically absorbed and desorbed, and it is in this respect well-known that chemical absorption and desorption of $CO_2$ occurs very slowly. In this respect and in order to achieve the aforesaid temperatures, it is suggested that in the lower zone $Z_i$ of the absorption column, filling material of large dimensions and of low unit contact surface area be used so that, while allowing absorption of the heat and condensation of the water vapor contained in the gas to be purified, any tendency on the part of the solution, by virtue of the rise in temperature, to restore part of the $CO_2$ and/or $H_2S$ which it had previously absorbed, is avoided. It is also known that a certain tendency, during the absorption phase, on the part of the hot fraction $Fc$ of the solution to degas the $CO_2$, may even be favorable to subsequent regeneration of the solution, improving the functioning of the cycle.

With regard to the regeneration column, with reference to FIG.1, it will be seen that the cold fraction $Ff$ is sent in directly at the top of the regeneration column itself, where, by virtue of its relatively low temperature, it condenses and employs for its reheating the heat which accompanies the $CO_2$ and/or $H_2S$ being desorbed; thus, the advantages of improving the thermal balance of the regenerator and of reducing the duty of the $CO_2$ coolant is achieved.

The hot fraction $Fc$ which, in the zone $Z_i$ has reached a substantially elevated temperature, is introduced at the bottom of the regeneration column and made to expand up to the pressure obtaining there. A considerable quantity of vapor develops, deriving as is well-known, from the difference in thermal content of the solution between the temperature at the outlet from the zone $Z_i$ and the boiling temperature at the pressure existing at the bottom of the regenerating column (this, in the majority of cases, is 1.1–1.25 atm.absolute, which corresponds to a boiling temperature of the alkaline carbonate solution of 105°–115°C). As it develops, this vapor carries off part of the $CO_2$ and/or $H_2S$ contained in the solution, regenerating it.

During the course of researches and appositely conducted studies, it has been established that the expulsion of $CO_2$ and/or $H_2S$ which occurs during expansion is relatively modest when simple alkaline carbonate solutions are used but, the expulsion increases substantially if 100–150g./l. of "activating" substances are added to the carbonate solutions, particularly arsenous acid, compounds of selenium and tellurium, amino acids (glycin), ethanol amine, boric acid and the like, in other words substances capable of increasing the efficiency of absorption and desorption of $CO_2$; the effect is greater if one uses high efficiency activators, particularly arsenous acid and amino acids (glycin), the acid nature of which favors the expulsion of the $CO_2$.

Experimentally, it has been established that the following typical solutions having an initial temperature of 150°C and an initial carbonatation degree of 65–70 percent (in other words the alkali of the solution is present for 65–70 percent as a bicarbonate and 30–35 percent as a carbonate), and made to expand up to atmospheric pressure, become regenerated to the following final levels of carbonatation:

Table 1

| | |
|---|---|
| Potassium arsenite solution 200 g/l $K_2O$ + 140 g/l As2O3 | 27% |
| Potassium carbonate solution 250 g/l $K_2O$ + 30 g/l glycin | 39% |
| Potassium carbonate solution 250 g/l $K_2O$ + 30 g/l DEA | 45% |
| Potassium carbonate solution 250 g/l $K_2O$, ordinary | 59% |

The aforesaid results may be used in numerous cases in industrial practice, particularly when not a very high purification of the gas to be purified is desirable. There are however substantially better results to be achieved if expansion takes place in a progressive and gradual manner, the $CO_2$ being expelled as the solution is given off, or in any event so as to allow the vapor time to desorb the $CO_2$ and/or $H_2S$ contained in the solution itself.

The progressive and gradual expansion method generically described above is characterized in that contact between the solution during the course of the regeneration and the gaseous mixture evolved therefrom is brought about not only in the expansion zone, but also in other distinct and separate zones, into which the gaseous mixture is fed with a $CO_2$ partial pressure below that of the solution the gaseous mixture being removed to the outside from those zones in which it acquires a $CO_2$ content such as would hinder the continuance of regeneration in subsequent contact zones. This becomes evident when the partial pressure of $CO_2$ in the mixture exceeds the partial pressure of $CO_2$ in the solution in any of the subsequent zones; however, as those of ordinary skill in the art are aware of, the removal of the gaseous mixture is desirable even before it reaches the extreme condition referred to above.

For example, the controlled expansion may be conducted in an expansion equipment such as a tower divided into several communicating zones, in which the level of the liquid is regulated so as to exert on the bottom a hydrostatic pressure equal to the pressure of the water vapor plus $CO_2$ possessed by the solution in the initial state, so that the solution fed to the base of the equipment may there initiate the evolution of water vapor and $CO_2$ and continue this gradually and progressively as the hydrostatic pressure diminishes in the ascending vertical direction until the top of the equipment is reached. Thus, within each of these zones, the solution and gases differ in temperature and composition from those in the other zones. The number of size of the respective zones is determined according to the fact that the water vapor extracted from the solution before the carbon dioxide must have sufficient time to desorb further carbon dioxide contained in the solution, so as to insure that the water vapor contained in excess in the gaseous mixture given off during expansion is properly utilized for desorption purposes. To that end, contact between the gases and the solution is promoted and improved with the aid of filling material, plates and stationary or moving mechanical appliances well known to those skilled in the art. A second guide is to regulate the expansion time so as to insure that the evolution of vapor takes place in conditions similar to those in a reboiler and ordinary regenerating columns.

In this respect, it has been found that the dwell time of the solution within the different zones varies depending upon the temperature and initial carbonate content of the solution. In other words, highly active solutions, such as those containing the "activating" substances identified above need less contact time than other less active solutions. Generally, those of ordinary skill in the art, with a minimum of experimentation, can determine suitable contact times for different solutions. However, it has been found that the solutions containing a high carbonate content (higher than 50 percent), better regenerative action is obtained if the carbon dioxide absorbed during expansion is removed from the system continuously.

By using the above method and working under the same conditions as above, final degrees of carbonatation can be obtained as follows:

TABLE No. 2

| | |
|---|---|
| Potassium arsenite solution 200 g/l $K_2O$; 140 g/l As2O3 | 7.2% |
| Potassium carbonate solution 250 g/l $K_2O$ + 30 g/l glycin | 27% |
| Potassium carbonate solution 250 g/l $K_2O$ + 30 g/l DEA | 35% |
| Potassium carbonate solution, 250 g/l $K_2O$, ordinary | 40% |

The solutions with the above-mentioned degrees of carbonatation have, as is well-known, low levels of $CO_2$ partial pressure, particularly the solutions of potassium arsenite, and make it possible to achieve in the absorption phase the purification required in industrial practice.

The regenerated solution is extracted from the regeneration column and is sent on for absorption, possibly after cooling in the coolant C, shown in broken lines in the drawings, while the vapor arising from expansion of the hot fraction Fc rises along the regeneration column counter-currently in relation to the cold fraction Ff which is thus regenerated.

In the present method, the heat necessary for functioning of the cycle may be supplied partly or wholly as heat given off by the gaseous mixture to be purified, to the hot fraction Fc of the solution. This depends on the weight balance of water in the system, in other words upon the fact that the solution must not change its composition and must not be diluted beyond the norm. This argument which relates to the present alternative and others subsequently described will be dealt with in Note 1 at the end of the description.

In FIG.1, in cases when it is required, the remaining part of the heat necessary for functioning of the cycle is supplied by the re-heater $R_t$, shown in broken lines in the drawing, and in such a case it is preferable and economically more convenient for the gaseous mixture which is to be purified first to pass through the reheater $R_t$ and subsequently to be introduced into the bottom of the zone $Z_t$ of the absorption column.

An example of the practical application of the aforesaid method is provided in example No.1 in which other clear advantages of the method will become apparent.

Figure 2:
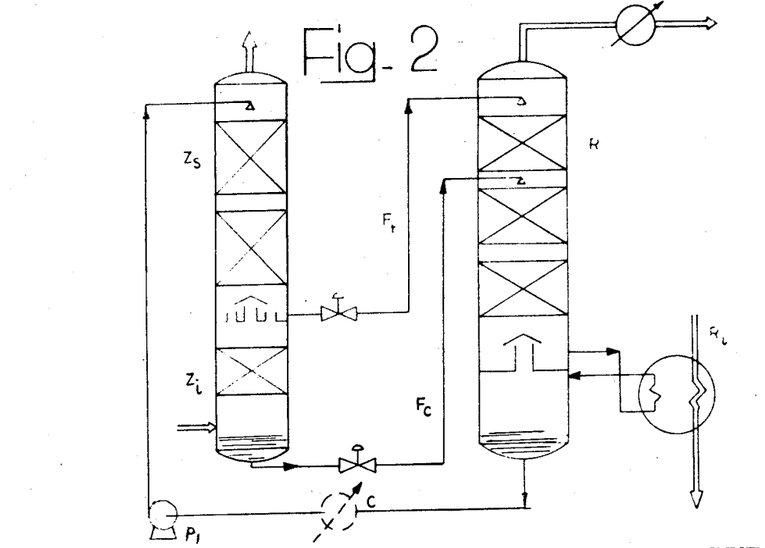
FIG. 2 represents embodiment A2 discussed below.

A2. An alternative version of the alternative described in A1 is shown in FIG.2 This alternative meets the case when the absorbent solution, and more properly the hot fraction Fc thereof, cannot, in the zone $Z_t$, raise its temperature beyond a certain limit, for example beyond 120°–130°C. In addition to the fact that the chemico-physical characteristics of the solution used (and basically, as stated above, its tendency to decompose and become corrosive), this may also be required under particular circumstances: in many cases, in fact, it is the same gaseous mixture to be purified which contains only a relatively small quantity of heat.

This alternative is shown in FIG.2. In it, the absorption column, divided into two zones, $Z_s$ and $Z_t$, is of similar arrangement and operation to that in alternative A1, with the difference however that the hot fraction Fc of the solution is heated in the zone $Z_t$ to a lower temperature which, in the case of mineral solutions of simple or activated alkaline carbonate, is around 120°–130°C. By virtue of its lesser heat content, the hot fraction Fc of the solution is suitably passed not to the bottom of the regenerating column but to an intermediate level, as shown on the drawing, and is expanded.

The expansion produces vapor and an expulsion of $CO_2$ and/or $H_2S$ similarly, but with less intensity than in the former embodiment A1.

Thus, for example, it has been found experimentally that the following typical solutions, having an initial temperature of 125°C and degree of carbonatation of 65–70 percent, caused to expand at atmospheric pressure, are regenerated to the values shown in column 1 of the following Table 3, if expansion is simple and instantaneous (flash), or to the values shown in the second column when controlled expansion takes place as described above.

TABLE No. 3

| | 1 | 2 |
|---|---|---|
| Potassium arsenite solution 200 g/l $K_2O$ + 140 g/l $As_2O_3$ | 37 % | 19 % |
| Potassium carbonate solution 250 g/l $K_2O$ + 30 g/l glycin | 47 % | 39 % |
| Potassium carbonate solution 250 g/l $K_2O$ + 30 g/l DEA | 55 % | 43 % |
| Potassium carbonate solution 250 g/l $K_2O$ ordinary | 65 % | 58 % |

The vapor produced by expansion of the hot fraction Fc, rising into the upper part of the regenerating column, is used for an initial partial regeneration of the cold fraction Ff, as stated previously.

The hot fraction Fc descends, together with the cold fraction Ff into the lower part of the regenerating column where it completes its regeneration by means of the heat supplied by the boiler $Ri$.

On account of the heat supplied by the hot fraction Fc and the partial regeneration produced, functioning of the regenerating column is considerably facilitated, its dimensions are reduced and the amount of heat to be supplied through the boiler $Ri$ also diminishes.

A3. Another variation on the above-described alternative is that shown in FIG. 3. This alternative embodiment is suitable for a case in which it is required that, in achieving the objects of the present invention, the absorbent solution undergoes no change in temperature, and cases when the solution, during the absorption phase, reaches temperatures close to ambient temperature, such as occurs for example in the case of ethanol amine, alkazide and similar solutions.

Figure 3:
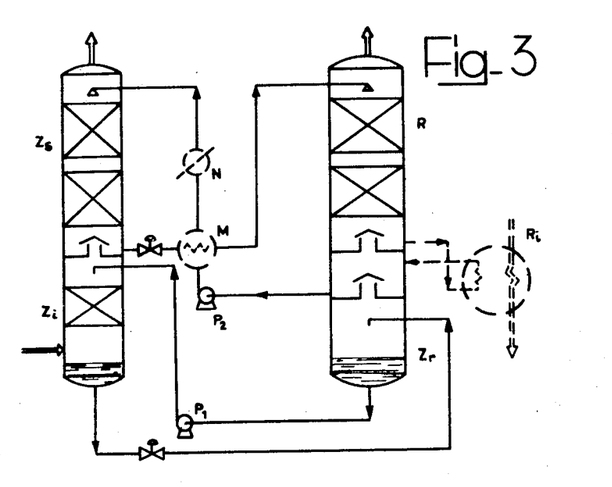
FIG. 3 represents embodiment A3 shown below.

As with the previous embodiments, the absorption column is still divided into two zones, the zone $Z_s$ for chemical absorption and the zone $Z_t$ for absorption of the heat contained in the gaseous mixture to be purified.

The regenerating column is also divided into two zones, the upper part R of which is the normal regenerator proper, provided at the bottom with a boiler $R_i$, shown by broken lines in the drawing, and the bottom part $Z_r$ is a zone in which the liquid originating from the zone $Z_t$ can expand.

The absorbent solution is cycled between the zone $Z_s$ of the absorption column and the zone R of the regenerating column, passing if desired through the cycle referred to as the "conventional" cycle, in other words in which between the regenerating column and the absorption column is a heat exchanger M and the refrigerant N, in manner known per se. In particular, the absorption column can function at ambient temperature or at temperatures close to ambient.

In the bottom zone $Z_t$ of the absorption column and in the bottom zone $Z_r$ of the regenerating column, any aqueous liquid which may in the majority of cases be water alone or an aqueous solution having no corrosive characteristics, which is chemically compatible with $CO_2$ and/or $H_2S$ and preferably in which $CO_2$ and/or $H_2S$ are not readily soluble, is made to circulate as subsequently specified.

The gas to be purified introduced into the zone $Z_t$ where it is brought into intimate contact with the above-defined aqueous liquid or water which descends from the top downwards, in countercurrently, absorbing the heat contained in the gas and becoming heated to a temperature which, as will be clarified hereinafter, is advisable to set as high as possible, in other words a temperature fairly close to that of the dew-point of the gas to be purified. The aqueous liquid or water or hot aqueous solution is extracted from the zone $Z_t$ and introduced into the bottom zone $Z_r$ of the regenerating column and caused to expand to the pressure obtaining therein. This in general is a pressure slightly above atmospheric pressure, so that the aqueous liquid or water is for practical purposes cooled to about 103°–105°C.

In this expansion, a quantity of vapor develops which corresponds to the heat extracted from the gaseous mixture to be purified in the zone $Z_t$ and the vapor thus obtained is introduced into the upper zone R of the regenerating column where it is used for the expulsion of the $CO_2$ and/or $H_2S$ contained in the solution and for regeneration of the solution itself.

The aqueous liquid or water which, in the above-mentioned expansion, becomes heated up to about 105°C, is extracted from the bottom of the bottom zone $Z_r$ of the regenerating column and is recycled in the zone $Z_t$ by means of a pump P1. The flow of aqueous liquid or water cycled by the pump must be of a quantity sufficient to convey from the zone $Z_t$ to the zone $Z_r$ the heat extracted from the gaseous mixture to be purified; consequently, it is a good idea for the temperature of the aqueous liquid or water emerging from the zone $Z_t$ to be the highest possible so that, in industrial practice, the zone $Z_t$ is dimensioned so that the aqueous liquid or water can become heated to a temperature fairly close to the dew-point of the gaseous mixture, which it will be advisable to introduce at the highest possible temperature.

Obviously, within the framework of the present invention, the bottom zone $Z_t$ of the absorber and the bottom zone $Z_r$ of the regenerator may be respectively separate from the absorption column and from the regenerating column.

In the practical application of the above-mentioned apparatus, it has been found that the aqueous liquid or water in the zone $Z_t$ can absorb a small quantity of $CO_2$ depending on the pressure and temperature existing in that zone.

Figure 4:
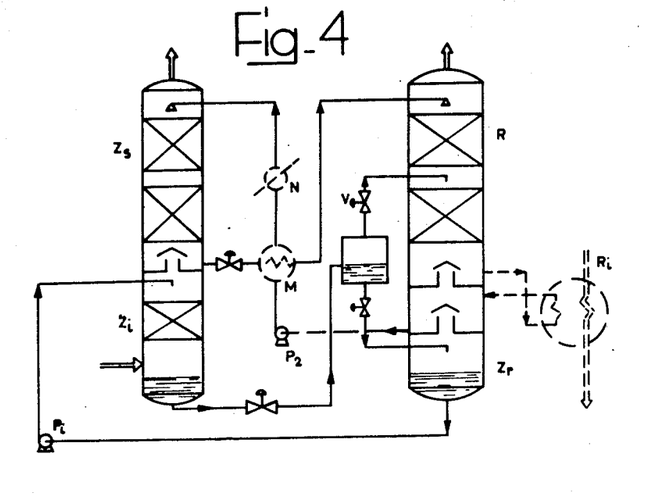
FIG. 4 represents an embodiment comprising a variation of embodiment A3.

In expansion, the above-mentioned $CO_2$ is liberated by the liquid together with vapor which, on account of the presence of the $CO_2$, diminishes its stripping efficiency. To avoid this disadvantage, it is suggested that, with reference to FIG. 4, expansion of the aqueous liquid or water take place in two successive zones. In the first zone V, at intermediate pressure, expansion commences and a vapor is obtained which contains virtually all the $CO_2$ dissolved in the aqueous liquid or the water; this vapor is introduced at an intermediate level into the regenerating column. The aqueous liquid or water originating from the said primary expansion zone is introduced into the bottom zone of the regenerating column $Z_r$ where it completes its expansion producing vapor which is virtually free from $CO_2$.

Where mineral solutions of simple or activated alkaline carbonate are used, the present embodiment A3 may use the same absorbent solution as an aqueous liquid circulating between the bottom zone $Z_t$ of the absorption column and the bottom zone $Z_r$ of the regenerating column. In such a case, it is advisable to use the two-stage expansion apparatus as previously described.

In this case, too, the heat given off by the gaseous mixture to be purified may be a part or all of the heat necessary for functioning of the cycle. This depends upon the weight balance of the water in that, as is well-known, the solution must not change its composition and must not become diluted beyond the norm. In this case, too, it is therefore envisaged to use a possible boiler $R_t$ shown in broken lines in the drawing. This argument will be dealt with in note 1 at the end of the description.

An exemplary embodiment of the apparatus described above is given in Example No.2.

B. The second alternative of the present invention is characterised by the fact that the gas to be purified gives off its heat to and in direct contact with the absorbent solution, while this latter performs chemical absorption of the $CO_2$ and/or $H_2S$. As in the previous embodiment, the gaseous mixture to be purified is introduced into the absorption column with a heat content which is a part or all of that needed for the cycle to function, so that the solution which descends through it, while it is performing the chemical absorption becomes heated either by the heat of reaction or by the heat contained in the gas to be purified.

The method offers four alternatives B1,B2,B3 and B4, according to the apparatus adopted to avoid the solution, passing down through the absorption column, increasing its temperature subsequently or so as to weaken the chemical absorption and render it less efficient.

B1. According to drawing, B1, shown in FIG.5, the solution as soon as it has absorbed a suitable quantity of $CO_2$ and/or $H_2S$ and is at a suitably elevated temperature as specified subsequently, is drawn off, wholly or partly, at an intermediate level of the absorption column, corresponding for example to point P shown on the drawing, and is treated in a regenerating zone E situated outside, by one of the methods described hereunder, and having the characteristic feature of eliminating part of the $CO_2$ and/or $H_2S$ contained in the solution, at the expense of a part of the heat contained in the solution itself, which therefore becomes cooled. Subsequently, the solution, cooled and partially regenerated, is returned to the absorption column to absorb further quantities of $CO_2$ and/or $H_2S$ and further heat contained in the gaseous mixture which is to be purified, and consequently avoiding the temperature exceeding the values at which chemical absorption might be weakened.

Figure 5:
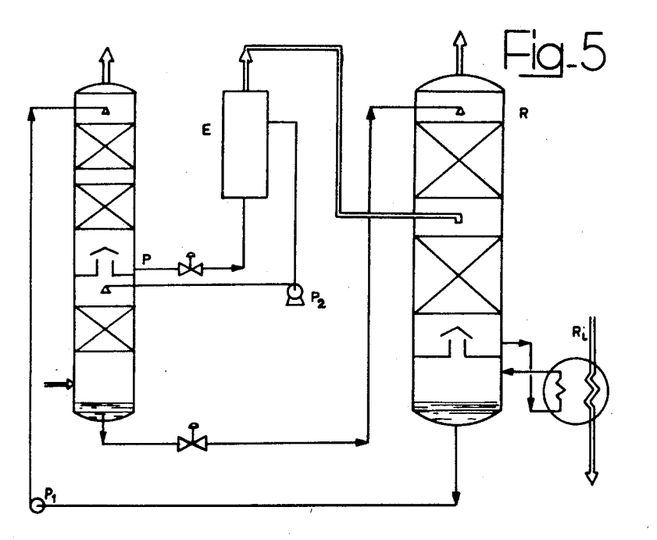
FIGS. 5–8, respectively, represent embodiments B1, B2,B3 and B4.

On leaving the absorption clumn, the solution is introduced into the regenerating column where it is treated in a per se known manner by the heat provided via the boiler $R_1$. The solution which is thus regenerated is recycled by the pump P1 and fed back to the top of the absorption column.

In practice, it is a good idea for the solution to be extracted from the absorption column at an intermediate level corresponding to the point P when it has performed a great part of the chemical absorption. In the case of solutions of alkaline carbonate activated with As2O3, glycin and DEA, this corresponds to roughly the point at which the solution reaches a degree of carbonatation of 50 percent, 60 percent and 60 percent respectively. The temperature of the solutions at the above-mentioned point is regulated so that it is comprised between 105° and 120°C.

One of the methods suggested in the present embodiment for regenerating the solution in the zone E is that of simple flash to atmospheric pressure whereas, as stated previously, better results are obtained by gradual and progressive expansion, as described above.

As in the previous cases, it has been found that during expansion, there is an elimination of $CO_2$ and/or $H_2S$ which is all the more efficient when an activator is contained in the solution, in other words, in order of preference: As2O3, glycin, DEA, while the simple carbonate solutions do not give appreciable results.

The results obtained experimentally are set out in the following table. In this table, the solutions used in the experiment are the solutions listed in the first column. The initial temperatures of the solutions are respectively 105°C, 110°C, 120°C and are set out on each of the three parts of the table. In each part are indicated the degrees of initial carbonatation, the degrees of final carbonatation and the $CO_2$ volumes consequently desorbed per volume of solution.

TABLE No. 4

Simple expansion

| | Initial index | 105°C/110°C/120°C Final index developed | Vol. $CO_2$ |
|---|---|---|---|
| Potassium arsenite solution 200 g/l $K_2O$, 140 g/l $As_2O_3$ | 1.5 | 1.42/1.41/1.36 | 3.8/4.2/6.7 |
| Potassium carbonate solution 250 g/l $K_2O$ + 30 g/l glycin | 1.6 | 1.51/1.49/1.47 | 5.3/6.5/7.7 |

| | | | |
|---|---|---|---|
| Potassium carbonate solution 250 g/l $K_2O$ + 30 g/l DEA | 1.6 | 1.58/1.55/1.50 | 1.2/3.0/5.9 |
| Potassium carbonate solution 250 g/l $K_2O$ | 1.65 | | |

Controlled expansion

| | | | |
|---|---|---|---|
| Potassium arsenite solution 200 g/l $K_2O$, 140 g/l $As_2O_3$ | 1.5 | 1.35/1.30/1.23 | 7.2/9.5/13.0 |
| Potassium carbonate solution 250 g/l $K_2O$ + 30 g/l glycin | 1.6 | 1.50/1.47/1.41 | 6.0/7.7/11.2 |
| Potassium carbonate solution 250 g/l $K_2O$ + 30 g/l DEA | 1.6 | 1.55/1.51/1.45 | 3.0/5.3/9.0 |
| Potassium carbonate solution 250 g/l $K_2O$ | 1.65 | 1.63/1.60/1.52 | 1.2/3.0/7.7 |

The terms "initial index" and "final index" indicate, respectively, the degree of carbonatation of the solution initially and finally; e.g., an index of 1–5 equals a degree of carbonatation of 0.5 (i.e., 50 percent).

It will be observed that the solution, after expansion in the zone E and the expulsion of $CO_2$ and/or $H_2S$ as indicated in Table No.4, is passed to the absorption column by the pump P2. This gives rise to a consumption of energy and an expense which can be justified only if the solution expels in zone E (and re-absorbs then in the bottom part of the absorbent) at least 8–10 parts of $CO_2$/ part of solution.

For the present embodiment, therefore, the arsenite solutions and solutions of carbonate activated with glycin are preferred. The DEA activated solutions are less interesting while the simple alkaline carbonate solutions are virtually useless if regenerated by means of simple flash.

In accordance with FIG.5, the vapor obtained in expansion in zone E is suitably passed to an intermediate level of the regenerating column and preferably the point at which the solution has approximately the same degree of carbonatation as the solution extracted from the absorption column.

The advantages of this embodiment are obvious to technicians skilled in the art and are the following:

1. The absorbent solution is, at the point P, partially regenerated which improves its absorption efficiency, thus rendering the size of the absorber smaller and more economical. By virtue of the said regeneration, each volume unit of the solution absorbs larger volumes of $CO_2$ and/or $H_2S$; the flow of solution therefore diminishes.
2. The dimensions of the regenerating column and particularly the diameter reduce in consequence of the reduction in flow of solution as stated in 1).
3. Part of the heat necessary for functioning of the cycle is furnished by the gaseous mixture during the said absorption. The rest of the heat is provided by the boiler $R_i$, the size and cost of which are therefore reduced.

Another method which can be utilized in the present embodiment for regenerating the solution in the zone E is that of treating the solution itself in direct contact with desorbent gases, as described for example in U.S. Pat. No. 3,037,844.

This method too, consumes for regeneration part of the heat contaoned in the solution, which therefore cools and, returning to the absorber, re-absorbs therein further quantities of $CO_2$ and further heat contained in the gas to be purified, consequently and appropriately regulating the absorption temperature.

Thus, for example, a solution of potassium arsenite, 200 g/l $K_2O$ and 140 g/l $As_2O_3$, extracted by the absorber at 105°C and with 50 percent carbonatation, treated first by expansion and then with desorbent gases in the ratio of 4 parts gas/part of solution, so as to cool the solution itself down to approx.90°C, attains a 15 percent degree of carbonatation, equal to an expulsion of 16 parts $CO_2$/part of solution.

This method achieves highly satisfactory results and is suggested when desorbent gases are available (inert gases arising from $NH_3$, methanol and similar synthesis) and when it is permissible for part of the absorbed $CO_2$ to be lost with the aforesaid inert gases and not used for productive purposes.

B2. A second embodiment of simpler application, B2, is that shown in FIG.6.

Figure 6:
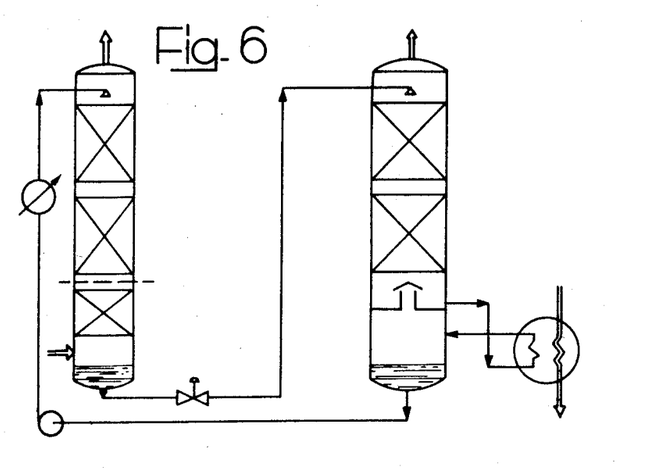

With this embodiment, the solution descending along the absorption column while it is performing chemical absorption becomes heated either by the heat of reaction or by the heat contained in the gaseous mixture to be purified which is supplied hot.

The object of the present invention is that chemical absorption of the $CO_2$ and/or $H_2S$ is not affected or weakened by the fact that the solution at the same time absorbs the heat contained in the gas to be purified.

In the previous embodiments A1 and A2, the above-mentioned purpose was achieved by sub-dividing the absorber into two zones, the zone $Z_s$ for chemical absorption and the zone $Z_t$ for heat absorption and by also sub-dividing the solution into two fractions, namely $Ff$ and $Fc$. The same object can be achieved, although to a lesser degree, with an absorber comprising a single zone and permeated by a single solution, which however is designed and dimensioned ideally in two zones (ideally separated by the broken line in FIG.6), the said zones being adapted mainly for chemical absorption in the upper zone and heat absorption in the bottom zone.

The design will be developed so that the flow of solution and the temperature at which this is supplied at the top of the absorber are regulated so that at the end of chemical absorption, the solution, becoming basically heated by the heat of absorption attains a temperature and a degree of carbonatation at which the partial pressure of $CO_2$ in the gaseous mixture is 1.5–2 times the partial pressure of $CO_2$ in the liquid, which corresponds to a satisfactory efficiency of chemical absorption.

Subsequently, the solution passing down through the bottom zone, will absorb the heat contained in the gaseous mixture to be purified and may increase its temperature until such time as the partial pressures of $CO_2$ and/or $H_2S$ in the gaseous mixture and in the liquid become equal.

In this way, the solution, although having no tendency to restore part of the previously absorbed $CO_2$, can absorb a greater quantity of heat which, within the framework of the present invention, will then be used in the regenerating phase.

The solution is extracted from the bottom of the absorption column and is passed to the top of the regenerating column in which it is expanded; by virtue of its higher temperature and its greater content of heat, the expansion, whether simple or gradual and progressive, produces a greater expulsion of $CO_2$ and/or $H_2S$.

The solution which has thus been partly regenerated, descends down the regenerating column, completing its regeneration by means of the heat provided by the boiler located opposite the bottom part of the column.

Under these circumstances, the output of the regenerator and the heat consumption are improved as compared with the prior art.

The regenerator solution is then fed back to the absorber, completing the cycle in a per se known manner.

B3. A third alternative is that shown in FIG.7.

Figure 7:
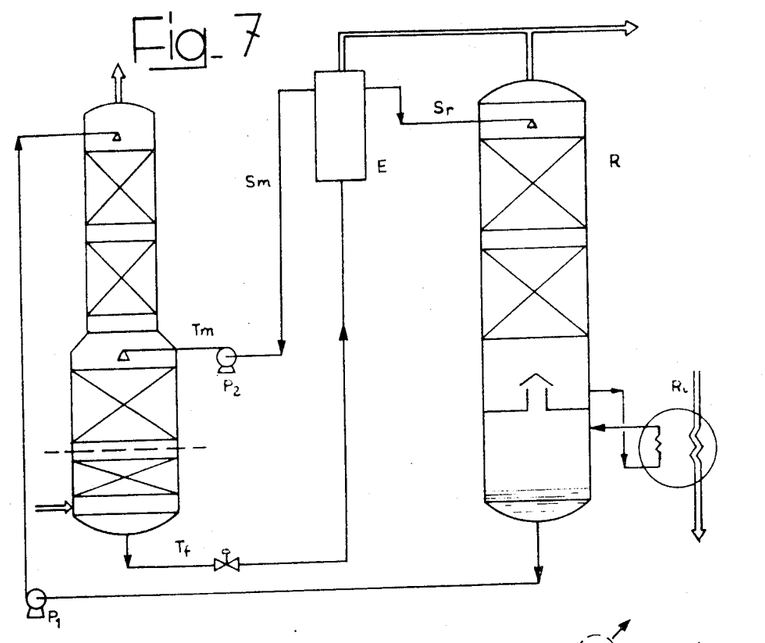

It consists in the fact that the solution passing through the absorption column absorbs the $CO_2$ and/or $H_2S$ and the heat given off by the gas to be purified.

When desired, the bottom part of the absorption column may be designed ideally as divided into two zones as specified previously under B2.

Upon completion of absorption, the solution is drawn off at the bottom of the absorption column at the temperature $Tf$ and is passed to the regenerating zone E in which, as in the previous alternative B1 and as will be described hereinafter, (i.e., after regeneration in zone E) is treated by one of the methods by which the expulsion of $CO_2$ and/or $H_2S$ takes place at the expense of a part of the heat contained in the solution itself, which therefore cools to the temperature $Tm$. The solution is subsequently divided into two fractions, of which the greater, $Sm$, partly regenerated and cooled, is fed back by the pump P2 to an intermediate level of the absorption column where, descending, it re-absorbs the quantity of $CO_2$ and/or $H_2S$ and the quantity of heat which it lost in the regenerating zone E.

The said quantity of heat, which is the quantity needed to heat the quantity of solution $Sm$ from the temperature $Tm$ to the temperature $Tf$ is provided by the same gaseous mixture which is to be purified, supplied at an apposite heat at the bottom of the absorption column.

The vapor and the $CO_2$ and/or $H_2S$ arising from the zone E combine again with the vapor and the $CO_2$ and/or $H_2S$ originating at the top of the regenerating column R and are removed from the system.

The other fraction $Sr$ of the solution originating from the regenerating zone E and sent instead to the regenerating column R where its regenerating process is completed in a per se known manner by the supply of heat from outside, via the boiler $Ri$, is then extracted from the regenerating column and passed to the top of the absorption column by the pump P1 (in cases where all the heat needed for the operation of the cycle is contained in the gas to be purified, this gas is made to pass firstly through the boiler $Ri$, where it gives off the heat needed to regenerate the fraction $Sr$ of the solution, and is subsequently introduced into the absorption column containing the heat necessary for regeneration in the zone E).

The solution can be regenerated in the zone E by means of simple expansion to atmospheric pressure. In the past, simple flash of an alkaline carbonate solution with no activators and its recycling to the absorber, had been proposed for use in a limited degree, in cases where the gas to be purified has a partial pressure of $CO_2$ in excess of 6–7 atm. absolute (80–100 psig), with the difference however that the heat for operating the cycle was not provided, as in the present alternative, by the same gaseous mixture to be purified, which was introduced into the absorption phase already appropriately heated.

In addition, in the present embodiment, use is made of the fact that expulsion of the $CO_2$ and/or $H_2S$ takes place more easily when the solution of alkaline carbonate contains activators, particularly $As_2O_3$ and glycin, on account of the acid character of these.

On this basis and also employing the method of gradual and progressive expansion, it has been found that the present embodiment can be suitably employed even when the partial pressure of $CO_2$ in the gaseous mixture to be purified is less than 80–100 psig, as above, and is for example comprised between 2–5 atm. absolute, as in the majority of cases of purification of gaseous mixtures at a pressure of 20–30 atm. absolute.

The results obtained experimentally by simple expansion and by gradual and progressive expansion are set out in the following table No.5, which is drawn up and should be read similarly to table No.4.

TABLE NO. 5

Simple Expansion

| | Initial index | 105°C/110°C/120°C Final index | Vols.$CO_2$ developed |
|---|---|---|---|
| Potassium arsenite solution 200 g/l $K_2O$, 140 g/l $As_2O_3$ | 1.65 | 1.45/1.43/1.38 | 9.5/10.5/12.9 |
| Potassium carbonate solution 250 g/l $K_2$ + 30 g/l glycin | 1.70 | 1.56/1.53/1.49 | 8.3/10.1/12.6 |
| Potassium carbonate solution 250 g/l $K_2O$ + 30 g/l DEA | 1.70 | 1.67/1.65/1.60 | 1.8/3.0/6.0 |
| Potassium carbonate solution 250 g/l $K_2O$ + − | 1.75 | | |

Controlled Expansion

| | | | |
|---|---|---|---|
| Potassium arsenite solution 200 g/l $K_2O$, 140 g/l $As_2O_3$ | | 1.65/1.36/1.32/1.25 | 13.8/15.7/19.0 |
| Potassium carbonate solution 250 g/l $K_2O$ + 30 g/l glycin | | 1.70/1.52/1.50/1.44 | 10.7/11.9/15.4 |
| Potassium carbonate solution 250 g/l $K_2O$ + 30 g/l DEA | | 1.70/1.57/1.53/1.47 | 7.7/10.1/13.7 |
| Potassium carbonate solution 250 g/l $K_2O$ | | 1.75/1.69/1.64/1.58 | 3.5/6.5/10.0 |

It will be observed that, in the present embodiment as well as in the previous embodiment B1, the economic advantage of the invention is based on the selection of the conditions under which the solution, while it is undergoing expansion, expels at least 8–10 parts $CO_2$ and/or $H_2S$. This is observed in the range of temperatures between 105°–115°C and better at 120°C and basically for the solutions which are activated with arsenic and those activated with glycin; the results are less satisfactory for those activated with DEA. Ordinary potassium solutions on the other hand are not really useful.

The advantages of the present embodiment B3 are obvious to persons skilled in the art and are the following:

A considerable part of the heat necessary for functioning of the cycle is supplied from the heat content in the gaseous mixture to be purified, which is therefore supplied hot in the absorption phase. The remainder of the heat is provided by the boiler $Ri$ of the regenerator R, in which is treated only the fraction $Sr$ of the solution. Consequently, the boiler $Ri$ has dimensions and a cost less than hitherto known. Also the dimensions and the diameter of the regenerating column are less in that it only regenerates the fraction Sr of the solution.

Regeneration of the solution in the zone E, in addition to being achieved by expansion, as described above, may be achieved also by treatment of the solution itself with inert gases or with air, as described in U.S. Pat. No. 3,037,844, and in a manner similar to that described in the previous embodiment B1.

B4. The fourth embodiment considers the case where the gaseous mixture to be purified has a considerable $CO_2$ partial pressure, for example at least greater than 5 atm. absolute, as is found in the case of gaseous mixtures in modern methods of gas production by partial combustion, in which $CO_2$ is at 30–35 percent, functioning at a pressure of approx, 80–100 atm. Moreover, there are numerous sources of high-pressure natural gas of pressures for example around 50–100 atm., with a $CO_2$ content which may be as much as 30–50 percent.

In such cases, the solution absorbs considerable quantities of $CO_2$ and/or $H_2S$ and, on completion of absorption, reaches degrees of carbonatation which are generally around 85–95 percent.

Under the aforesaid conditions, expansion of the solution is more satisfactorily performed gradually and progressively as described above and it is sufficient to regenerate the solution up to a degree of carbonatation which allows the solution itself, fed back to the absorption column, to purify the gaseous mixture to the final $CO_2$ content required in industrial practice.

Thus for example a solution of potassium arsenite of 250 g/l K2O and 175 g/l As 203, with an initial degree of 90 percent carbonatation and an initial temperature of approx. 150°C, is regenerated by gradual and progressive expansion to a final degree of carbonatation of 10 percent. This is sufficient to purify the gaseous mixture down to 0.1 percent $CO_2$ if absorption takes place at a pressure of approx. 100 atm.

Under the aforesaid conditions, in other words on account of the facility with which the highly carbonated solutions are regenerated during expansion, it is sufficient for the gas to be purified to be introduced into the absorption phase with a relatively small amount of latent heat. It is necessary however to respect the weight balance of water in the system, as will be stated in the appended Note 1.

Figure 8:
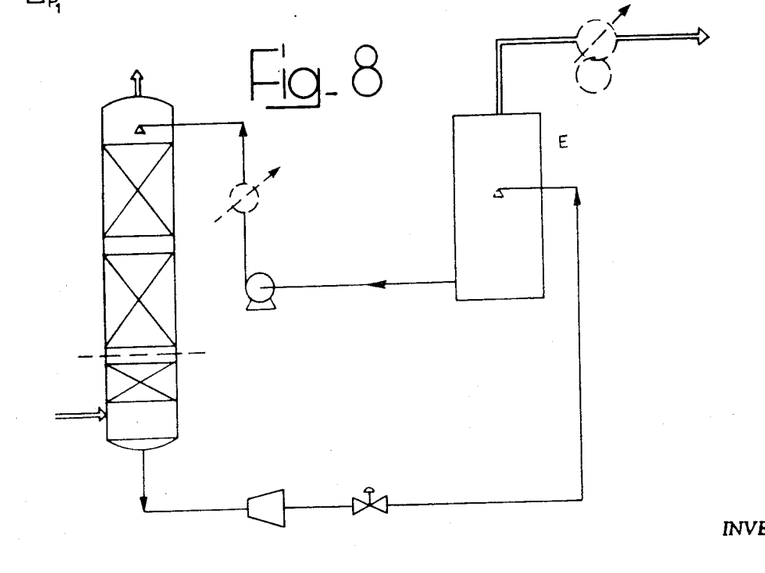

The embodiment B4, referring to FIG.8, consists therefore simply of a single zone absorption column in which the solution washes on the counter-current principle the gas which is to be purified and which is fed in hot.

When desired, the absorption column may be designed ideally as divided into two zones as specified previously under B2.

The solution is extracted from the bottom of the absorption column and is passed to a regenerating zone where the regeneration itself is carried out by an expansion of the solution. The solution which thus becomes regenerated and cooled, is fed back to the absorption column generally without any need for intermediate refrigeration.

Figure 9:
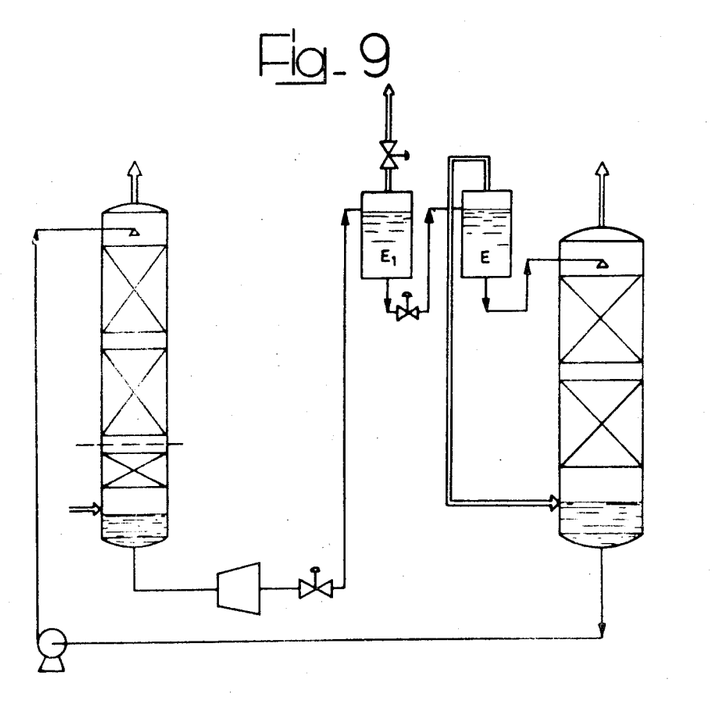

Regeneration of the solution may be performed, as in the previous cases, by simple expansion or gradual and progressive expansion, but FIG.9 shows an expansion apparatus in which the solution expands in two successive stages and is then passed to a regenerating column, which practical result is highly suitable for the present embodiment.

With reference to FIG.9, the solution originating from the bottom of the absorption column undergoes a primary expansion in the zone E1, where a pressure of 2–3 atm. absolute is maintained, a pressure at which the solution as it expands cools by only 8°–10°C. In this primary expansion, the vapor obtained carries away the greater part of the $CO_2$ and/or $H_2S$ which can be degassified by the solution; it is removed from the system as shown in the drawings. The solution is passed to zone E to complete expansion, vapor developing with little CO2 and/or $H_2S$ and suitable for regeneration. The solution is then passed to the top of the regenerating column, the vapor being passed to the bottom.

Table No. 6, similarly to tables 4 and 5, gives typical experimental results. As before, the activiated solutions give the best results. The fourth column gives the temperature of the solution on completion of expansion, knowledge of which makes it possible to evaluate the possible need for subsequent cooling of the solution before it is passed to the absorption column.

TABLE No.6

Simple expansion

|  | Initial index | Final index | 125°C/150°C Vols. $CO_2$ developed | Temp. sol. after exp. |
|---|---|---|---|---|
| Potassium arsenite solution 250g/l $K_2O$; 175g/l $As_2O_3$ | 1.85 | 1.37/1.31 | 28.5/32.1 | 90°/95°C |
| Potassium carbonate solution 250g/l $K_2O$ + 30g/l glycin | 1.85 | 1.48/1.42 | 22.0/25.6 | 97°/98°C |
| Potassium carbonate solution 250g/l $K_2O$ + 30g/l DEA | 1.90 | 1.60/1.49 | 18.8/24.4 | 95.5°/97°C |
| Potassium carbonate solution 250g/l $K_2O$ | 1.95 | 1.70/1.63 | 14.8/19.0 | 95°/98°C |

Controlled Expansion

|  | Initial index | Final index | 125°C/150°C Vols. $CO_2$ developed | Temp. sol. after exp. |
|---|---|---|---|---|
| Potassium arsenite solution 250g/l $K_2O$; 175g/l $As_2O_3$ | 1.85 | 1.25/1.10 | 36.6/44.5 | 100°/102°C |
| Potassium carbonate solution 250g/l $K_2O$ + 30g/l glycin | 1.85 | 1.40/1.28 | 26.7/34.0 | 100°/102°C |
| Potassium carbonate solution 250g/l $K_2O$ + 30 g/l DEA | 1.90 | 1.47/1.37 | 25.5/31.5 | 101°/102°C |
| Potassium carbonate solution 250g/l $K_2O$ | 1.95 | 1.55/1.44 | 23.7/30.2 | 100°/102°C |

The advantages of the present embodiment are considerable and can be summarized as follows:

All the heat required for functioning of the cycle is provided by the heat contained in the gaseous mixture which is to be purified, which is appropriately hot when supplied to the absorption column, absorption and regeneration of the solution taking place in a single stage cycle; the boiler has been abolished from the regenerating phase. Even the refrigerant for the solution is not required in the majority of cases, in that, particularly when activated solutions are used and when the progressive expansion method is employed, degrees of final regeneration and a final temperature are obtained which are sufficient for the purification required.

Basically, in conclusion, as can be seen from example No.3, the heat necessary for operation of the cycle is around 600–670 Kcal/Nm3 $CO_2$.

A case of application of the present embodiment is set out in example No.3.

As has been previously stated, the present invention offers the advantage that, for useful purposes of the functioning of the cycle, it extracts an amount of heat contained in the gaseous mixture to be purified, which is greater than that achieved in the prior art by means of the boiler.

In fact, by means of the boiler, the gas to be purified is cooled effectively to a temperature averaging 120°–125°C, in other words about 10° greater than the boiling temperature of the solution.

In the present invention, the gas is cooled on the other hand usefully down to a temperature of 105°–110 °C in the embodiments A1 and A2, down to 105°C in embodiment A3, down to approx. 95°C in embodiment B4 and also in B1 and B3. This greater utilization is very important and in the cases of practical application it is around 100–230 kcal/Nm3 $CO_2$, according to the pressure of absorption and the initial content of $CO_2$ in the gaseous mixture to be purified, as is shown by the following table:

Table No. 7

| Absorption pressure | 20 atm. abs. | | 25 atom. abs. | | 30 atm. abs. | |
|---|---|---|---|---|---|---|
| Concentration $CO_2$ gas at entry | 20% | 25% | 20% | 25% | 20% | 25% |
| Extra heat extracted when the gas is cooled to 95°C instead of 125°C. Kcal/cu.m.$CO_2$ | 230 | 184 | 195 | 156 | 175 | 140 |
| Extra heat extracted when the gas is cooled to 105°C instead of 125°C. Kcal/cu.m.$CO_2$ | 160 | 128 | 140 | 112 | 125 | 100 |

The method which is the subject of the present invention, with its relative embodiments, has been described with reference to a single-stage cycle, but it is not limited thereto, being suitable for extension also to a two-stage cycle by applying the normal knowledge of a man skilled in the art.

Note 1

In embodiments A1, A2, A3 and B4, it has been stated that the heat necessary for functioning of the cycle may be supplied partly or wholly as heat given off by the gas to be purified, to the absorbent solution and to any other intermediate liquid; it has been stated that this depends on the weight balance of the water in the system, in other words the fact that the solution must not change its composition and must not be diluted beyond the norm.

In fact, a man skilled in the art will know that the heat necessary for functioning of the cycle is supplied at the bottom of the regenerating column by means of the boiler (this part of the heat is referred to here as "dry heat") and partly as directly injected vapor (this part is referred to as "wet heat").

It is well known that the amount of wet heat is that corresponding to the vapor which passes through the regenerator without condensing, emerges at the top together with the $CO_2$ and/or $H_2S$ desorbed and is then condensed in the subsequent refrigerating unit. This condensate, or rather the part of the condensate which is removed from the system and discharged outwide, must correspond to the quantity of direct vapor (wet heat) which can be introduced at the bottom of the regenerating column. The rest of the heat, in other words the heat necessary for the heating of the solution, heat of reaction and the like, is the dry heat which must be furnished via the boiler.

In the embodiments A1, A2, A3 and B4, the heat given off by the gaseous mixture to be purified to the solution or to the intermediate liquid, is mainly wet heat. In fact, it is substantially constituted by the vapor contained in the gas to be purified, which condenses on the solution, heating it and diluting it; in the subsequent expansion, the solution develops vapor in a quantity approximately corresponding to that first absorbed; the said vapor is subsequently introduced into the regenerator in a direct form, in other words as wet heat.

The weight balance of the water in the system, in other words the distribution between dry heat and wet heat, is the condition which determines how much of the heat necessary for functioning of the cycle can be supplied as heat given off by the heat to be purified to the solution, or to the intermediate liquid, and how much must on the other hand be supplied via the boiler.

Generally, the systems which use the so-called "isothermal" cycle allow the heat given off by the gaseous mixture to the solution or to the intermediate liquid to be all the heat necessary for cycling (in other words the quantity which corresponds to total abandonment of the boiler), while when using other cycles, the distribution of the supply of heat must be studied in each individual case. It is however observed that even in these cases, it is possible to regulate the weight balance of the water so as to allow complete abandonment of the boiler.

One method of regulating the weight balance is as follows. The heat contained in the solution being regenerated, whether the solution is hot or boiling, can be extracted in the form of a stream of vapor which is basically used in order to extract from the regenerated solution part of the carbon dioxide and/or other acid gases contained therein, thus improving the degree of regeneration. The extraction of the vapor may be carried out by any suitable method, for example, by subjecting the solution to a drop in pressure or to a treatment with inert gases. More specifically, the boiling solution may be removed from the regeneration zone and injected into an expansion zone, whereby a stream of vapor results containing a portion of the carbon dioxide to be removed from the absorption solution which, being cooled with a reduced carbon dioxide content, is returned to the absorption zone. The stream of vapor may be vented from the system.

A second method of regulating the weight balance of the water and reducing the overall energy requirements is to pass the liquid solution coming from the absorber under pressure through an ejector, wherein by passing through the ejector, the liquid creates a pressure drop which is applied to the liquid at suitable points in the purifying cycle so as to promote the elimination therefrom of the absorbed impurities. Due to the fact that the solution has been expanded down to a low pressure, a greater amount of carbon dioxide and/or hydrogen sulfide is removed, but more especially, the solution is cooled to a greater extent so that, upon returning to the absorber, it produces therein temperatures that are lower and more conducive for efficient absorption, despite the fact that the mixture to be purified is fed in at a high temperature.

In these method, the regenerated solution is treated with inert gases or by a vacuum created by mechanical means or by an ejector in which is used exhausted solution supplied under pressure by the absorber, so as to extract from the solution itself a flow of vapour which, among the other advantages, also has that of being able to eliminate the said vapor from the system, concentrating the solution and appropriately adjusting the balance of the water.

EXAMPLE 1

The example described is a practical application of the embodiment A1.

A gaseous mixture originating from partia combustion of hydrocarbons with oxygen and subsequent conversion, is washed with a solution of alkaline arsenite, 200 g/l $K_2O$ and 140 g/l $As_2O_3$, at a pressure of 29 atm.abs.

The gaseous mixture to be purified has a capacity of 143,000 Nm3/hr., with an initial $CO_2$ content of 31.5 percent.

With reference to FIG. 1, a flow of 1640 cu.m of solution, is passed to the top of the absorption column, at a temperature of 100°C and a degree of carbonatation of 7½ percent (which corresponds to the fact that the alkali contained in the solution is 7½ percent as a bicarbonate and 92½ percent as a carbonate).

As it descends through the upper zone of the absorption column, the solution undergoes chemical absorption until it reaches a degree of carbonation of 65 percent. At the same time, it becomes heated by the heat of reaction and by a small quantity of heat contained in the gas, to a temperature of 110°C.

Under these conditions, chemical absorption takes place with normal efficiency by virtue of the fact that, at the bottom of the zone $Z_s$, the partial pressure of $CO_2$ in the gas (9 atm.abs.) is 2.1 times greater than the partial pressure of $CO_2$ in the solution, degree of carbonatation 65 percent, temperature 110°C.

At this point, the solution is divided into two fractions, the lesser of which, the cold fraction Ff, composed of 560 cu.m/hr. is passed directly to the top of the regenerating column, while the other fraction, the hot fraction Fc, composed of 1,080 cu.m./hr., continues its descent through the bottom zone $Z_t$. In this zone, the gaseous mixture to be purified is supplied at the temperature of 184.5°C and is saturated over water (the gas to be purified is made to pass first through the boiler Ri, where it gives off its heat dropping from 190°C to 184.5°C and is subsequently introduced into the zone $Z_t$). In this zone, the solution, at an initial temperature of 110°C, is heated to 150°C, absorbing $40.28.10^6$ K/cal/hr. from the gas.

In turn, the gaseous mixture is cooled from 184.5°C saturation over water to 113°C saturation over solution and is passed into the upper zone $Z_s$ of the absorption column.

The solution, heated to 150°C, is extracted from the bottom of the zone $Z_t$ and is made to expand gradually and progressively to a pressure of 1.3 atm.abs. which exists in the bottom of the regenerating column. Expansion results in a development of steam and an elimination of the $CO_2$ so that the solution, after expansion, has a degree of carbonatation of 7.5 percent. The expanded vapor rises through the regenerator, countercurrent in relation to the cold fraction Ff of the solution originating from the bottom of the zone $Z_s$ which is also regenerated. The thus regenerated solution is extracted from the bottom of the regenerating column at a temperature of approx. 110°C and is cooled by means of refrigerant down to a temperature of 100°C and is passed to the absorption column.

From the weight balance of water, in the present example, it arises that in order to maintain the concentration of the solution constant it is necessary to supply 8,320,000 kcal/hr. in the boiler Ri (dry heat).

The heat supplied to the system is therefore 8,320,000 kcal/hr. as mentioned above and 40,280,000 Kcal/hr. supplied in the zone $Z_1$ of the absorber as heat contained in the gas to be purified. In toto, therefore, 48,600,000 Kcal/hr.

The above-mentioned supply of heat corresponds to a consumption of 1,090 Kcal/Nm3 $CO_2$ and a supply of 29,600 Kcal/cu.m. of solution.

The present example, the regenerated solution, cooled to a temperature of 100°C, purifies the gas to a final content of approx. 0.25% $CO_2$. In the event of greater purification being desired, the regenerated solution may be cooled to lower temperatures. Conveniently, it is possible to adopt the split-stream principle, in which only a part of the solution is cooled.

The advantages revealed by the above example are as follows:

The cost of the boiler is considerably reduced as compared with what was necessary hitherto.

In fact, the boiler is transmitting only 17 percent of the heat required for functioning of the cycle and moreover transmits it with a marked rise in temperature, which diminishes its size still further;

the regenerating column, too, is more economical, in that the diameters of the upper part are dimensioned only to cope with the cold fraction Ff of the solution, which is one-third of the total.

EXAMPLE 2

The example is a practical application of the embodiment A3.

The gaseous mixture originating from partial combustion of hydrocarbons with oxygen and subsequent conversion, is washed with an aqueous solution of MEA of concentration 2.5 N, at a pressure of 29 atm. abs. The gaseous mixture which is to be purified has a capacity of 143,000 Nm3/hr. with an initial content of 18% $CO_2$, and is available at a temperature of 180°C, saturated over water.

With reference to FIG. 3, the MEA solution, suitably cooled in the refrigerating unit, is introduced into the absorption column, descends through the said column, absorbing 22 parts $CO_2$/part of solution. The solution extracted from the absorption column passes through the exchanger in which it is pre-heated by the heat of the solution regenerated and introduced into the regenerating column at a temperature of approx. 100°C. In the regenerating column, the said solution is regenerated with a heat consumption of 4.5 kg vapour/Nm3 $CO_2$ = 2,430 kcal/Nm3 $CO_2$, in other words with an hourly supply of $62.8 \times 10^6$ Kcal/hr. The regenerated solution is drawn off from the regenerating column at approx. 110°C, passes firstly through the exchanger and subsequently through the refrigerating unit and is recycled by means of the pump P2. Thus, the solution follows the so-called "conventional" cycle in a per se known manner.

On the basis of what is stated in Note 1, from the weight balance of water in the system, it is evident that in order to maintain the concentration of the solution constant, it is necessary for the amount of heat for functioning of the cycle ($62.8 \times 10^6$ Kcal/hr) to be supplied at the ratio of $37.6 \times 10^6$ Kcal/hr., via the boiler $Ri$ and in the ratio of $25.2 \times 10^6$ Kcal/hr. by means of the heat contained in the gaseous mixture to be purified, given off in the zone $Z_t$.

Under these conditions as the gaseous mixture to be purified is available at the temperature of 180°C saturated over water, the mixture itself is divided into two fractions, the first consisting of 35,000 Nm3/hr., is made to pass through the boiler $Ri$ where it gives off its heat up to a temperature of 120°C approx. and is then passed into the zone $Z_t$ of the absorber; the second fraction is on the other hand constituted by 108,000 Nm3/hr., which is passed into the zone $Z_t$ at a temperature of 180°C. The resulting gas stream fed into the bottom of the zone $Z_t$ has a temperature of about 165°C, said temperature resulting from the combining of the stream directly fed to the absorber without going through the reboiler, and the stream which was fed through the reboiler before being fed to the absorber. In this zone, it is calculated that a flow of water is supplied which is equal to 320 cu.m./hr. at a temperature of 105°C and which is heated to a temperature of 175°C, which is a temperature fairly close to the dew-point of the gaseous mixture to be purified. In this way, the said gas to be purified is cooled to approx. 108°C by the water.

The water which, as previously stated, is heated to a temperature of 175°C, is expanded in the bottom part of the regenerating column where there is a pressure of 1.20 atm.abs., corresponding to a temperature of 105°C. After expanding, the water is taken up by the pump and recycled.

The steam arising from expansion of the water, combining with that produced by the heat supplied through the boiler $Ri$, rises in the upper zone of the regenerating column, regenerating the solution which descends through it.

The advantages disclosed by the above-mentioned example are the following:

the boiler gives out an amount of heat which is only 60 percent that required for functioning of the cycle, with a consequent reduction in cost;

the heat contained in the gas to be purified is extracted and used up to 105°C (while the boiler would be used only up to 120°C).

EXAMPLE 3

This example relates to a practical application of the embodiment B4.

A gaseous mixture originating from partial combustion of hydrocarbons with oxygen and subsequent conversion, is washed with a solution of alkaline arsenite, 250 g/l $K_2O$ and 175 g/l $As_2O_3$, at a pressure of 100 atm. The gaseous mixture to be purified has a capacity of 143,000 Nm3/hr. with an initial content of 31% $CO_2$ and is washed at 100 atm. as stated above.

With reference to FIG. 8, a flow of solution constituted by 935 cu.m./hr., is passed to the top of the absorption column, which is constituted by a single stage. The solution has a degree of carbonatation of approx. 10 percent and a temperature of 102°C; the gaseous mixture to be purified is introduced at the bottom of the absorber at a temperature of 225°C, saturated over water.

The gaseous mixture to be purified, leaving the absorption column at a temperature of 102°C, therefore gives off therein a quantity of heat equal to $29.4 \times 10^6$ Kcal/hr.

As is known from the present invention, the heat contained in the gaseous mixture to be purified is given off to the solution mainly in the lower part of the absorber, whereas the $CO_2$ and/or $H_2S$ are given off mainly in the upper part.

The solution therefore, descending through the absorption column and performing chemical absorption of 44.400 Nm3/hr., $CO_2$ reaches a degree of 90 percent carbonatation at an intermediate level of the absorber itself, becoming heated to a temperature of 118°C, basically by the heat of reaction ($12.4 \times 10^6$ Kcal.).

Under these conditions, the upper part of the absorption column, as has been stated in the description, is dimensioned according to the normal designs in that the solution with a 90 percent degree of carbonatation and a temperature of 118°C, has a vapor pressure which is about half of the partial pressure of $CO_2$ in the gaseous mixture, in other words corresponding to suitable efficiency of the chemical absorption.

Subsequently, as it continues its descent through the bottom part of the absorption column, the solution absorbs the heat contained in the gas to be purified and becomes heated to 150°C.

It will be observed that, in keeping with this temperature, the solution has a vapor pressure which is approximately equal to the partial pressure of $CO_2$ in the gaseous mixture and therefore, as stated in the description, the solution has virtually no tendency to restore a part of the $CO_2$ which it had previously absorbed.

As a monitoring calculation, it will be observed that the heating of 935 cu.m. of solution from 102°C to 150°C is achieved by the heat of reaction ($12.4 \times 10^6$ Kcal) and by the heat given off by the heat to be purified ($29.4 \times 10^6$ Kcal).

The solution is then extracted from the bottom of the absorption column; the energy is contained may possibly be recovered in a recovery turbine; subsequently, it is expanded in the regenerating zone E to a pressure close to atmospheric pressure. As stated in the description, the expansion takes place progressively and gradually, the $CO_2$ being discharged outside as it is developed. In this way, a degree of 10 percent carbonatation can be achieved.

The water vapor arising from expansion, together with the degasified $CO_2$ is removed from the system. If desired, the water vapor and the $CO_2$ can be made to pass through a refrigerating unit. The condensate obtained is discharged outside while the $CO_2$ can be used in other processes.

During expansion, the solution cools to about 102°C. It is subsequently passed to tbe top of the absorption column without intermediate refrigeration. Purification of the gaseous mixture of approx. 0.15 percent $CO_2$ is achieved. More extensive purification, for example to 0.1 percent, is easily obtainable by cooling the solution which is passed to the top of the absorption column, down to a temperature of 95°C in a suitable refrigerant shown in broken lines in the drawing.

It will be observed that the weight balance of the water, even in cases where the above-mentioned refrigerating units are used, is achieved positively, in other words all the heat needed for functioning of the cycle is provided in the absorption column by the gaseous mixture which is to be purified.

The advantages disclosed by the aforesaid example can be basically summarized in the fact that the absorber is of the single-stage type and the regenerator consists of a single zone for expansion of the exhausted solution. The boiler used in the prior art is completely dispensed with. Possibly, in order to improve purification, a refrigerating unit may be employed to cool the regenerated solution from 102°C to 95°C.

If desired, the consumption of heat in the aforesaid example may be considerably reduced by appropriately modifying the scheme. For example, application of the embodiment A1, as well as of the embodiments B1 and B3, considerably reduce the consumption of heat.

We claim:

1. In a process for removing gaseous impurities selected from the group consisting of $CO_2$, $H_2S$ and mixtures thereof from hot gaseous mixtures containing said impurities, said process comprising:
   absorbing said gaseous impurities in an aqueous absorbent solution by contacting said hot gaseous mixtures with said solution at above atmospheric pressure;
   regenerating the solution having said impurities absorbed therein by heating said solution at about atmospheric pressure to expel a vapor containing said impurities;
   removing said vapor containing said impurities from the system; and
   recycling the regenerated solution to the absorption step with an optional cooling step prior to introducing the recycle into the absorption step, wherein at least part of the heat necessary for heating the solution in the regeneration step is derived from said hot gaseous mixtures by passing said hot gaseous mixtures, prior to feeding said hot gaseous mixtures to said absorption step, in indirect heat-exchange with the solution undergoing regeneration in a reboiler, the improvement comprising reducing or eliminating the reboiler requirement by extracting from said hot gaseous mixtures containing said impurities a greater amount of heat than that amount of heat extracted in said reboiler by a process which comprises:
   a. feeding said gaseous mixtures at a temperature of from 165° to 225°C to the bottom of an absorption column divided into a lower heat transfer zone and an upper absorption zone and feeding said aqueous absorbent solution to the top of said absorption column wherein said solution descends firstly through said absorption zone absorbing said gaseous impurities from the gas mixtures ascending therethrough wherein absorption occurs until the partial pressure of said gaseous impurities in the ascending gaseous stream is at least 1.5 times the partial pressure of said gaseous impurities in the solution and wherein the solution becomes heated by the heat of reaction of the absorption and wherein said solution descends secondly through said heat transfer zone becoming heated by direct heat exchange with the hot gaseous mixtures ascending therethrough,
   b. removing a portion of the solution from the bottom of the absorption zone prior to said solution entering the top of said heat transfer zone and feeding it to the top of a regeneration column through which it descends, and
   c. removing the heated solution from the bottom of the absorption column and feeding it to the bottom of the regeneration column wherein a vapor is expelled therefrom due to the lower pressure existing in the regeneration column,
      wherein the composition of the solution circulating between said absorption and regeneration columns is maintained constant by passing the hot gaseous mixture through said reboiler only to the extent necessary to maintain the amount of water in said solution constant by providing heat to evaporate excess water.

2. The process of claim 1 wherein the heated solution removed from the bottom of the absorption column is fed to an intermediate level of said regeneration column.

3. In a process for removing gaseous impurities selected from the group consisting of $CO_2$, $H_2S$ and mixtures thereof from hot gaseous mixtures containing said impurities, said process comprising:
   absorbing said gaseous impurities in an aqueous absorbent solution by contacting said hot gaseous mixtures with said solution at above atmospheric pressure,
   regenerating the solution having said impurities absorbed therein by heating said solution at about atmospheric pressure to expel a vapor containing said impurities,
   removing said vapor containing said impurities from the system, and
   recycling the regenerated solution to the absorption step with an optional cooling step prior to introducing the recycle into the absorption step, wherein at least part of the heat necessary for heating the solution in the regeneration step is derived from said hot gaseous mixtures by passing said hot gaseous mixtures, prior to feeding said hot gaseous mixtures to said absorption step, in indirect heat-exchange with the solution undergoing regeneration in a reboiler, the improvement comprising reducing or eliminating the reboiler requirement by extracting a greater amount of heat from said gaseous mixtures containing said impurities than that amount extracted in said reboiler by a process which comprises:
   a. feeding said gaseous mixtures at a temperature of from 165° to 225°C to the bottom of an absorption column divided into a lower heat transfer zone and an upper absorption zone wherein said gaseous mixtures ascend firstly through said heat transfer zone and secondly through said absorption zone;

b. feeding said aqueous absorbent solution to the top of said absorption zone wherein said solution descends therethrough and absorbs said gaseous impurities from the gas mixtures ascending therethrough wherein absorption occurs until the partial pressure of the gaseous impurities in the ascending gaseous stream is at least 1.5 times the partial pressure of the impurities in tbe solution and wherein the solution becomes heated by the heat of reaction of the absorption, c. feeding an aqueous liquid compatible with the gaseous impurities contained in said hot gaseous mixtures to the top of said heat transfer zone, which liquid descends therethrough and becomes heated by direct heat exchange with the hot gaseous mixtures ascending therethrough, d. removing the aqueous absorbent solution containing said impurities absorbed therein from the bottom of said absorption zone and feeding the solution containing said impurities to the top of a regeneration column through which said solution descends, e. removing the heated aqueous liquid from the bottom of the heat transfer zone and feeding it to the bottom of said regeneration column wherein a vapor is expelled therefrom due to the lower pressure existing in the regeneration column, f. recycling the regenerated aqueous absorbent solution to the top of said absorption zone, and g. recycling said aqueous liquid from the bottom of said regeneration column to the top of said heat transfer zone, wherein the composition of said aqueous absorbent solution circulating between said absorption zone and said regeneration column is maintained constant by passing the hot gaseous mixtures through said reboiler only to the extent necessary to maintain the amount of water in said aqueous absorbent solution constant by providing heat to evaporate excess water.

4. The process of claim 3 wherein said aqueous liquid comprises an aqueous absorbent solution.

5. The process of claim 4 wherein the heated aqueous absorbent solution removed from the bottom of said heat transfer zone is preliminarily expanded at a pressure intermediate the pressure of the absorption column and the regeneration column, the vapor resulting from said preliminary expansion being introduced into an intermediate level of said regeneration column wherein the aqueous absorbent solution resulting from said preliminary expansion is introduced into the bottom of said regeneration column wherein a vapor is expelled therefrom due to the lower pressure existing therein.

6. In a process for removing gaseous impurities selected from the group consisting of $CO_2$, $H_2S$ and mixtures thereof from hot gaseous mixtures containing said impurities, said process comprising:

absorbing said gaseous impurities in an aqueous absorbent solution by contacting said hot gaseous mixtures with said solution at above atmospheric pressure;

regenerating the solution having said impurities absorbed therein by heating said solution at about atmospheric pressure to expel a vapor containing said impurities;

removing said vapor containing said impurities from the system, and recycling the regenerated solution to the absorption step with an optional cooling step prior to introducing the recyle into the absorption step, wherein at least part of the heat necessary for heating the solution in the regeneration step is derived from said hot gaseous mixtures by passing said hot gaseous mixtures, prior to feeding said hot gaseous mixtures to said absorption step, in indirect heat-exchange with the solution undergoing regeneration in a reboiler, the improvement comprising eliminating the reboiler requirement and extracting a greater amount of heat from said hot gaseous mixtures containing said impurities than that amount extracted in said reboiler by a process which comprises:

a. feeding said gaseous mixtures at a temperature of from 165° to 225°C to the bottom of an absorption column without feeding said hot gaseous mixtures through the reboiler of a regenerating column, wherein said hot gaseous mixtures ascend through said absorption column, b. feeding an aqueous absorbent solution to the top of said absorption column wherein said solution descends therethrough and becomes heated by the direct heat exchange contact between the descending solution and the ascending gaseous mixture and wherein the descending solution absorbs said gaseous impurities from the ascending gaseous mixture, the absorption occurring until the partial pressure of the impurities in the ascending gaseous mixture is at least 1.5 times the partial pressure of the impurities in the solution descending therethrough and wherein said solution is further heated by the heat of reaction of said absorption, c. removing the heated aqueous absorbent solution from the bottom of the absorption column and expanding it in an expansion zone thereby expelling a vapor therefrom containing said gaseous impurities.

* * * * *